(12) United States Patent
Murayama et al.

(10) Patent No.: US 6,970,912 B2
(45) Date of Patent: *Nov. 29, 2005

(54) COMPUTER SYSTEM HAVING A PLURALITY OF COMPUTERS EACH PROVIDING A SHARED STORAGE ACCESS PROCESSING MECHANISM FOR CONTROLLING LOCAL/REMOTE ACCESS TO SHARED STORAGE DEVICES

(75) Inventors: Hideki Murayama, Kunitachi (JP); Hiroshi Yashiro, Kawasaki (JP); Satoshi Yoshizawa, Musashino (JP); Kazuo Horikawa, Yokohama (JP); Takehisa Hayashi, Sagamihara (JP); Hiroshi Iwamoto, Hadano (JP); Kimitoshi Yamada, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/311,952

(22) Filed: May 18, 1999

(65) Prior Publication Data

US 2003/0126420 A1 Jul. 3, 2003

Related U.S. Application Data

(63) Continuation of application No. 08/670,757, filed on Jun. 21, 1996, now Pat. No. 5,935,205.

(30) Foreign Application Priority Data

Jun. 22, 1995 (JP) ............................................. 7-155762

(51) Int. Cl.[7] ............................................. G06F 15/167
(52) U.S. Cl. ....................... 709/216; 709/203; 709/215; 709/217; 709/222; 709/229; 710/29; 710/113; 710/240; 710/305; 711/152; 713/1; 713/200; 714/7

(58) Field of Search ................................. 709/203, 215, 709/216, 217, 222, 229; 700/178; 710/29, 113, 240, 305; 711/152; 713/1, 200; 714/7; 718/1, 104; 707/10, 104.1, 20, 201; 370/480

(56) References Cited

U.S. PATENT DOCUMENTS

4,393,459 A * 7/1983 Huntley et al. ............. 711/152
4,649,479 A * 3/1987 Advani et al. .................. 709/1

(Continued)

FOREIGN PATENT DOCUMENTS

JP     96706     1/1997

OTHER PUBLICATIONS

"The VAXcluster Concept: An Overview of a Distributed System", N.P.Kronenberg, et al., Digital Technical Journal, No. 5, Sep. 1987.

(Continued)

*Primary Examiner*—Jack B. Harvey
*Assistant Examiner*—Hai V. Nguyen
(74) *Attorney, Agent, or Firm*—Mattingly, Stanger, Malur & Brundidge, P.C.

(57) ABSTRACT

A computer system having a plurality of computers connected to each other by a computer coupling mechanism. Each computer includes a processor, memory, I/O device, disk control mechanism, computer coupling network adapter, disk requirement processing section connected to a system bus, and a disk connected to a disk control mechanism. The disk requirement processing section controls the disk, in response to a processing requirement for the disk from one of the processors of the other computers, based on structural definition information. The structural definition information describes a structure of the computer system. The computer system may be a loosely-coupled computer system.

20 Claims, 9 Drawing Sheets

U.S. PATENT DOCUMENTS

| | | | | |
|---|---|---|---|---|
| 4,982,324 | A | * | 1/1991 | McConaughy et al. ...... 709/222 |
| 5,023,774 | A | * | 6/1991 | Sakai et al. .................... 710/29 |
| 5,107,456 | A | * | 4/1992 | Schuur ........................ 710/305 |
| 5,109,511 | A | * | 4/1992 | Nitta et al. .................. 718/104 |
| 5,109,515 | A | * | 4/1992 | Laggis et al. .................. 707/10 |
| 5,414,856 | A | * | 5/1995 | Yokota ........................ 710/240 |
| 5,457,679 | A | | 10/1995 | Eng et al. ..................... 370/395 |
| 5,471,634 | A | * | 11/1995 | Giorgio et al. ........... 707/104.1 |
| 5,475,819 | A | * | 12/1995 | Miller et al. ................. 700/178 |
| 5,490,270 | A | * | 2/1996 | Devarakonda et al. ...... 707/201 |
| 5,526,352 | A | | 6/1996 | Min et al. .................... 370/395 |
| 5,548,724 | A | * | 8/1996 | Akizawa et al. ............. 709/203 |
| 5,548,726 | A | * | 8/1996 | Pettus ......................... 370/480 |
| 5,555,244 | A | | 9/1996 | Gupta et al. ................. 370/397 |
| 5,564,019 | A | * | 10/1996 | Beausoleil et al. .......... 709/215 |
| 5,613,069 | A | | 3/1997 | Walker ................... 395/200.66 |
| 5,668,943 | A | * | 9/1997 | Attanasio et al. ............... 714/7 |
| 5,675,787 | A | * | 10/1997 | Miller et al. ............. 707/104.1 |
| 5,745,710 | A | | 4/1998 | Clanton, III et al. ........... 348/7 |
| 5,771,354 | A | * | 6/1998 | Crawford .................... 709/229 |
| 5,774,668 | A | * | 6/1998 | Choquier et al. ............ 370/480 |
| 5,787,264 | A | * | 7/1998 | Christiansen et al. ........ 710/113 |
| 5,892,945 | A | * | 4/1999 | Mirchandaney et al. .... 718/104 |
| 5,935,205 | A | * | 8/1999 | Murayama et al. ......... 709/216 |
| 5,996,075 | A | * | 11/1999 | Matena ....................... 713/200 |

OTHER PUBLICATIONS

E. Solari et al, PCI Hardware and Software, Annabooks, 1998, pp. 15–17.

D.E. Comer, Internetworking with TCP/IP, Prentice–Hall, 1991, pp. 94–95.

H.M. Deitel, An Introduction to Operating Systems, Addison–Wesley, 1990, pp. 375–376.

"Implementing a Fibre Channel SCSI Transport", R. Snively, IEEE, 1994.

Case Studies in Distributed System Design, G.F. Coulouris, et al., Addison–Wesley Publishing Co., Chapter 10, 1988.

* cited by examiner

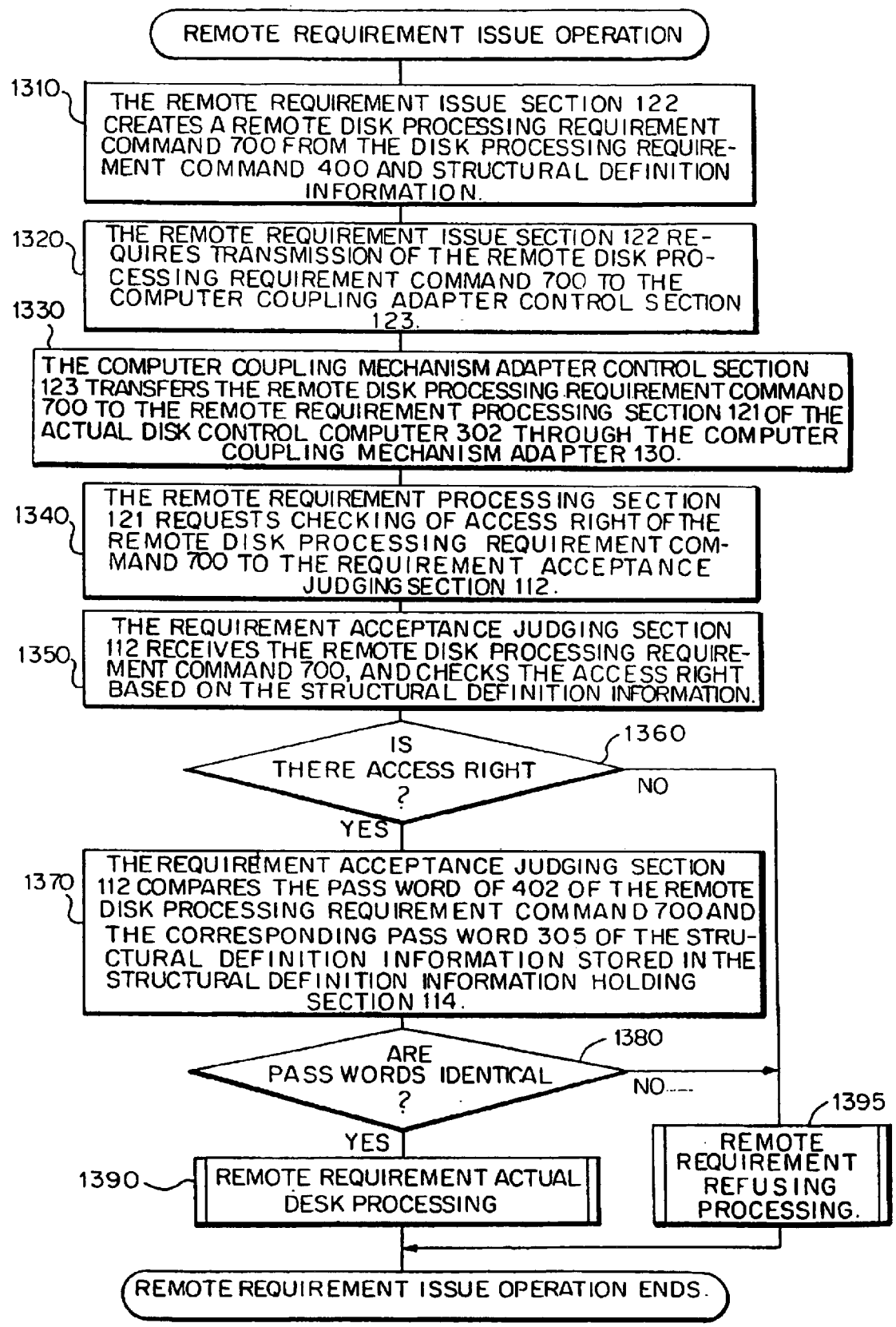

FIG. 14a

1492 — THE REMOTE REQUIREMENT ISSUE SECTION 122 CREATES A DISK PROCESSING STATUS 500 FROM THE REMOTE DISK PROCESSING STATUS 800.

1495 — THE REMOTE REQUIREMENT ISSUE SECTION 122 RETURNS THE DISK PROCESSING STATUS 500 TO THE PROCESSOR 101.

THE REMOTE REQUIREMENT ACTUAL DISK PROCESSING ENDS.

- 1510: REMOTE REQUIREMENT PROCESSING SECTION CORRESPONDING REQUIREMENT HOLDING SECTION
- 1520: REQUIREMENT CONTROL SECTION CORRESPONDING REQUIREMENT HOLDING SECTION
- 1530: DISK REQUIREMENT SERIALIZING SECTION
- 1540: ACTUAL DISK CONTROL SECTION.

115

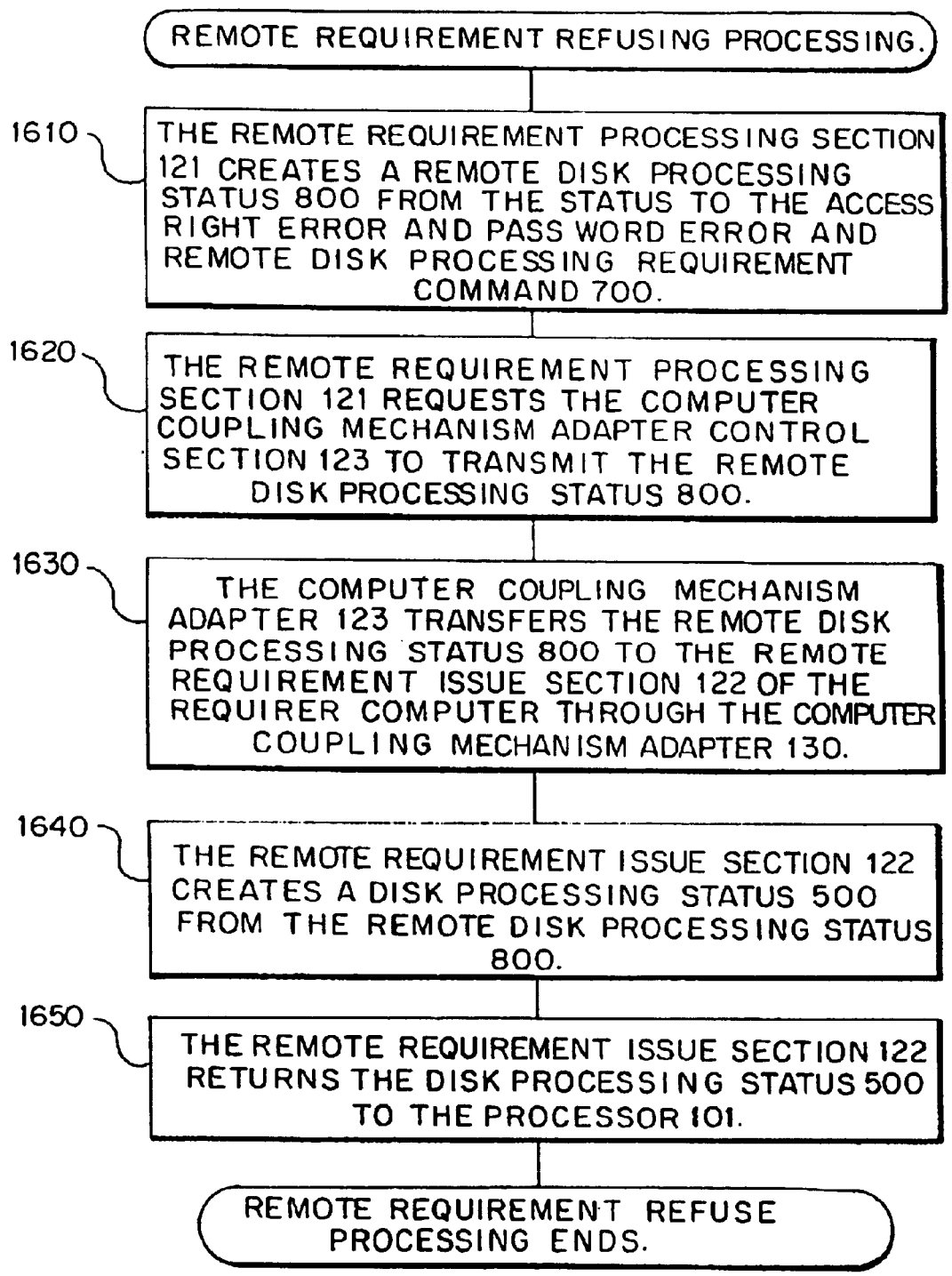

COMPUTER SYSTEM HAVING A PLURALITY OF COMPUTERS EACH PROVIDING A SHARED STORAGE ACCESS PROCESSING MECHANISM FOR CONTROLLING LOCAL/REMOTE ACCESS TO SHARED STORAGE DEVICES

This is a continuation of application Ser. No. 08/670,757, filed Jun. 21, 1996, now U.S. Pat. No. 5,935,205.

BACKGROUND OF THE INVENTION

The present invention relates to a computer system having a plurality of computer systems connected to each other. More particularly, the present invention relates to a computer system having a plurality of computers connected to each other, wherein each computer controls access to a shared memory based on structural definition information which describes a structure of the computer system and wherein the computer system may be a loosely-coupled computer system.

Loosely-coupled computer systems which share hard disks so as to share data have been proposed. In order to implement such systems a plurality of hard disk controllers and an attachment for connecting hard disks to be shared are required.

Examples of apparatus for implementing hard disk sharing by SCSI Profile of Fibre Channel is described in The VAXcluster Concept: An Overview of a Distributed System, by Nancy P. Kronenberg et. al., Digital Technical Journal, No.5 September 1987, pp 7–21, and examples of apparatus for implementing Fibre Channel Small Computer System Interface (SCSI) Profile which has been standardized in ANSI, is described in Implementing a Fibre Channel SCSI Transport, by Robert Snively, IEEE COMPCON, Spring 1994, pp 78–82 have been proposed.

Examples of apparatus implementing a Network File System (NFS) is described in DISTRIBUTED SYSTEMS, by George F. Coulouris et. al., pp 391–407, 1991 as a means for realizing file sharing by Remote Procedure Call (RPC) in a loosely-coupled computer system has also been proposed.

In Fibre Channel, when the shared hard disks are accessed, access is required to be conducted through the attachment. Thus, the increased access to the attachment causes the reduction of performance, the performance reduction is a serous disadvantage.

A System is a system which uses other processors for performing processing operations based upon the request of another processor. RPC provides for communications between processors to cause other processors to execute processing for another processor. Thus, soft overhead increases. Increased soft overhead causes a reduction in the performance of the system. The reduced performance is a disadvantage.

SUMMARY OF THE INVENTION

It is the object of the present invention to provide a computer system in which a processor directly controls shared hard disks through an attachment so as to provide high performance hard disk sharing, wherein the computer system may be a loosely-coupled computer system.

Another object of the present invention is to provide a loosely-coupled computer system having a plurality of computers connected to each other, wherein each computer controls access to a shared memory based on structural definition information which describes a structure of the computer system, wherein the computer system may be a loosely-coupled computer system.

The present invention provides a computer system having a plurality of computers connected to each other, wherein each of the computers is connected to a shared memory device. Each computer includes a controller for controlling access from the computer to the shared memory device connected to the computer and permitting access to the shared memory device from another computer in response to a processing requirement from the other computer. The controller in each computer permits access to the shared memory device based on structural definition information which describes a structure of the computer system. The computer system may be a loosely-coupled computer system.

Further, the present invention provides a computer system, which is structured so that a processor required for hard disk access controls directly the hard disk. The processor is also provided with a requirement judging section for judging a hard disk processing requirement from another processor, a hard disk requirement processing section for processing the processing requirement, and a remote disk controlling section for transferring as required the processed requirement between the processor connected to the hard disk and an attachment for remote access by the other computer.

BRIEF DESCRIPTION OF THE DRAWINGS

The present invention will be more apparent from the following detailed description, when taken in conjunction with the accompanying drawings, in which:

FIG. 13 is a flow chart of the remote requirement processing;

FIG. 15 is a block diagram of the disk control mechanism sharing control section;

FIG. 16 is a flow chart of the remote requirement refusing processing.

DETAILED DESCRIPTION OF THE PREFERRED EMBODIMENTS

Figure 1:
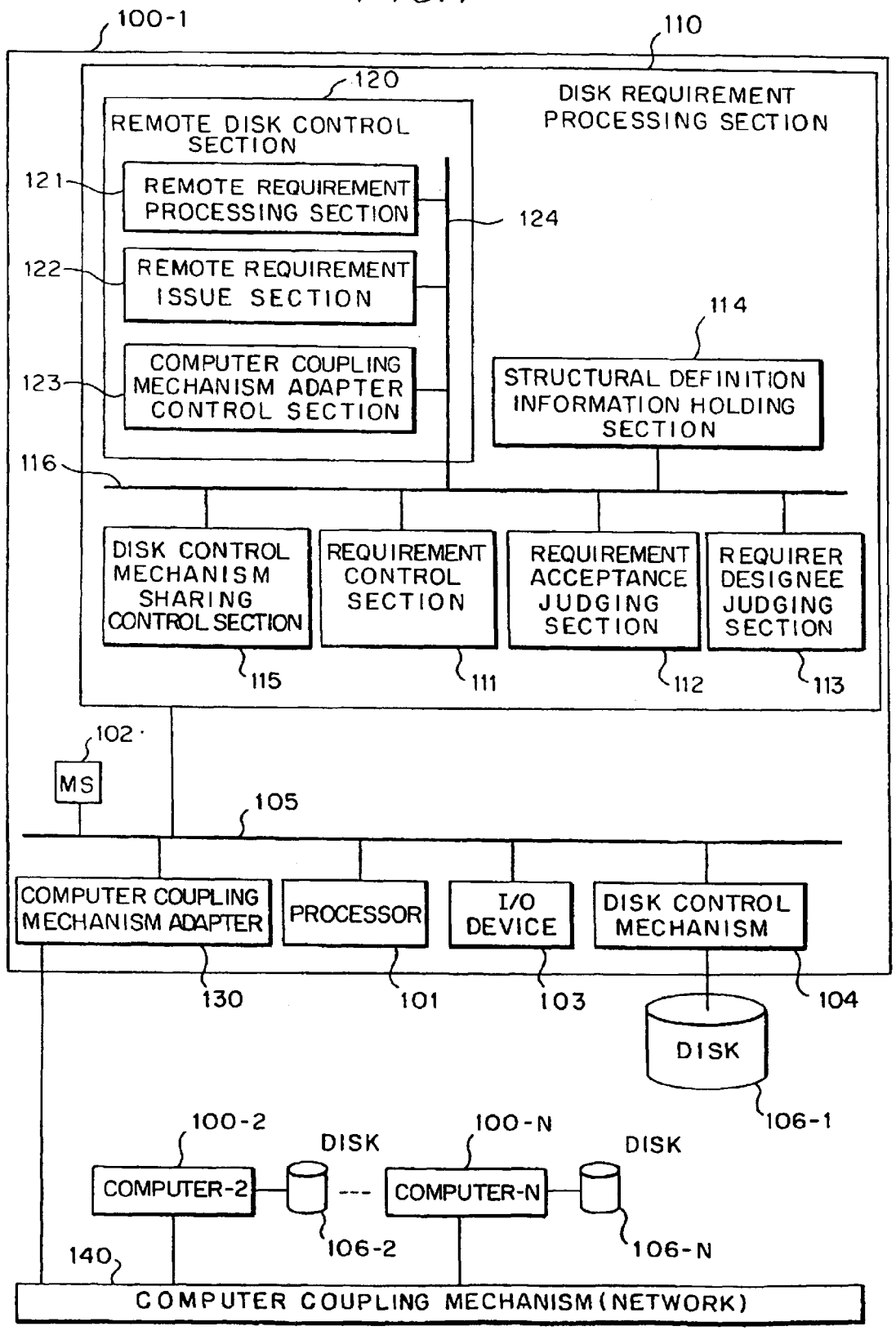
FIG. 1 is a block diagram of the first embodiment of a loosely-coupled computer system structure.

The present invention will be described referring to the drawings.

A first embodiment of a computer system of the present invention is shown in FIG. 1. The computer system illustrated in FIG. 1 may be a loosely-coupled computer system which is structured from computers 100-1 to 100-N coupled to each other by a computer coupling mechanism 140 (N is a natural number hereinafter). Each of the computers 100-1 to 100-N comprises a processor 101, memory 102, I/O device 103, disk control mechanism 104, computer coupling network adapter 130, and disk requirement processing section 110, which are connected to a system bus 105, and a disk 106-1 to 106-N connected to a disk control mechanism 104. The processor 101 comprises, for example, a CPU. The memory comprises, for example, a RAM. The I/O device 103 is a device for input and output, and comprises a secondary memory associated with, for example, a display, keyboard, and hard disk. The I/O device 103 may not necessarily be contained as an element of a computer 100-1 to 100-N in a case where communication processing by the computer coupling network adapter 130 executes the input-output function.

The disk control mechanism 104 is a mechanism for controlling the disk 106-1 to 106-N responding to a processing requirement from the disk requirement processing section 110, and, for example, comprises logic such as TTL and CMOS. The disks 106-1 to 106-N each comprises a secondary memory such as a hard disk.

The computer coupling network adapter 130 is a device for coupling computers 100-1 to 100-N and the computer coupling mechanism 140 to each other and performing transmitting-receiving processing of data in responding to an indication from the processor 101 and disk requirement processing section 110, and, for example, logic such as TTL and CMOS. The computer coupling mechanism 140 is a coupling network for coupling the computers 100-1 to 100-N to communicate to each other. The computer coupling mechanism 140, for example, comprises logic such as TTL and CMOS. The computer coupling mechanism can also take the form of a network or any other type of connection or coupling apparatus such as a bus, a switch or plural switches, an exchange or switching system for example an Asynchronous Transfer Mode (ATM) switching system. The computer coupling mechanism can also be a Small Computer System Interface (SCSI). A SCSI can also be used to connect the disk control mechanism 104 to the disk 106-1 to 106-N.

The disk requirement processing section 110 performs communication between the disk requirement processing sections 110 through the computer adapter 105 and computer coupling mechanism 140 as required and responds to a processing requirement from the processor 101 to the corresponding disk control mechanism 104. The disk requirement processing section 110 responds to the processing requirement instead of the disk control mechanism 104. Thus, the processor 101 can control the access to the disk 106-1 to 106-N in the same access control procedure. The disks from 106-1 to 106-N can be shared only when sharing is needed, therefore, the computer coupling mechanism 140 will not impact on the performance of the computer.

Next, details of a disk requirement section 110 are described. A disk requirement processing section 110 receives two types of processing requirements, namely a processing requirement from the processor 101 in the same computer and a remote processing requirement from the other computers from 100-1 to 100-N connected through the computer coupling mechanism 140. The disk requirement processing section 110 performs two types of control processing operations, namely control of the disk control mechanism 104 in the same computer and issue of remote control requirement to other computers from 100-1 to 100-N connected through the computer coupling mechanism 140. The disk requirement processing section 110 comprises a requirement control section 111, requirement acceptance judging section 112, required designee judging section 113, structural definition information holding section 114, disk control mechanism sharing control-section 115, and remote disk control section 120, which components are connected to the internal bus 116.

The requirement control section 111 receives a processing requirement from the processor 101 in the same computer requiring processing of the disk control mechanism 104 and a remote processing requirement from other computers connected through the computer coupling mechanism 140 and performs the requested processing requirements. The requirement control section 111, for example, comprises logic such as TTL and CMOS.

The requirement acceptance judging section 112 judges acceptance of the processing requirement received by the disk requirement processing section 110 based on the structural definition information stored in the structural definition information holding section 114. The requirement acceptance judging section 112, for example, comprises logic such as TTL and CMOS.

The required designee judging section 113 judges to determine which of a computer and disk are to be assigned to perform the processing requirement received by the disk requirement processing section 110 based on the structural definition information stored in the structural definition information holding section 114. The received designee judging section 113, for example, comprises logic such as TTL and CMOS.

The structural definition information holding section 114 stores structural definition information which describes a structure of the computer system. Particularly, the structural definition information is used to determine whether the sender of the processing requirement has access right to the corresponding disk, and whether a predetermined password has been provided for improvement of security.

The disk control mechanism sharing control section 115 performs an adjustment between two types of processing requirements, namely a processing requirement from the processor 101 in the same computer to the disk control mechanism 104 and remote processing requirement from the other computers connected through the computer coupling mechanism 140. The disk control mechanism and, for example, comprises logic such as TTL and CMOS.

The remote disk control section 120 controls the disk control mechanism 104 in response to a remote processing requirement from one of the other computers connected through the computer coupling mechanism 140 and issues remote control requirements to the computers connected through the computer coupling mechanism 140.

The remote disk control section 120 comprises a remote requirement processing section 121, a remote requirement issue section 122, and a computer coupling mechanism adapter control section 123, which are connected to the internal bus 124.

The remote requirement processing section 121 performs processing of a remote processing requirement from the other computers connected through the computer coupling mechanism 140. The remote requirement processing section 121, for example, comprises logic such as TTL and CMOS. The remote requirement issue section 122 issues remote control requirements to other computers connected through the computer coupling mechanism 140. The remote requirement issue section 122, for example, comprises a logic such as TTL and CMOS.

The computer coupling mechanism adapter control section 123 controls the computer coupling mechanism adapter 105 to communicate to other computers connected through the computer coupling mechanism 140. The computer coupling mechanism adapter control section 123, for example, comprises logic such as TTL and CMOS.

Figure 2:
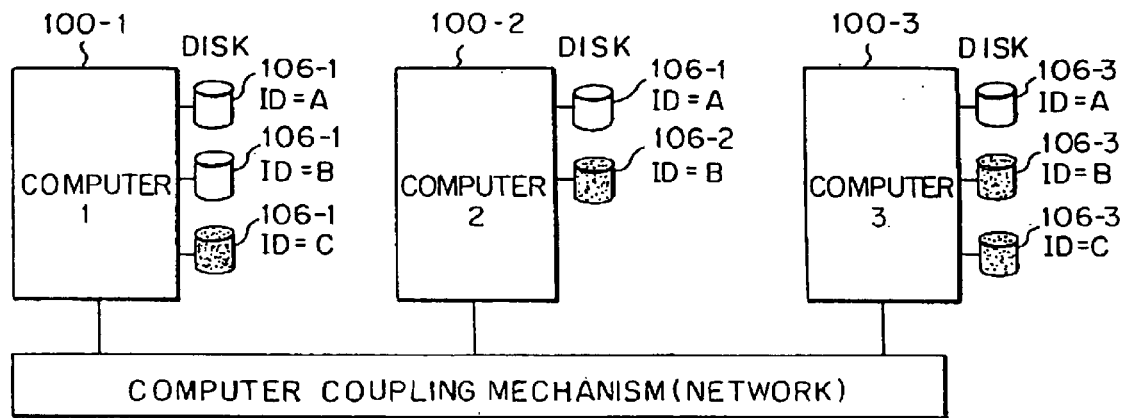
FIG. 2 is a block diagram of the second embodiment of a loosely-coupled computer system structure.

In FIG. 2, another embodiment of a loosely-coupled computer system structure is illustrated. FIG. 2 illustrates an example in which three computers and disks connected to each computer are shared partially. The computer-1 100-1 has disks 106-1, ID=A, B, and C where ID represents identifiers in each computer. The disks 106-1, ID=A and B are non-shared disks. The disk 106-1, ID=C is a disk shared by the computer-1 100-1 and the computer-2 100-2.

The computer-2 100-2 has disks 106-2, ID=A and B. The disk 106-2, ID=A is non-shared disk, and the disk 106-2, ID=B is a disk shared by the computer-2 100-2 and the computer-3 100-3. The computer-3 100-3 has disks 106-3, ID=A, B, and C. The disk 106-3, ID=A is non-shared disk, and the disks 106-3, ID=B and C are disks shared by the computer-1 100-1, computer-2 100-2 and computer-3 100-3.

Table 1 shows an example of structural definition information corresponding to the loosely-coupled computer system structure embodiment 2. The structural definition information is information for representing structural definition such as what computer and disk correspond to the processing required to the disk requirement processing section 110, whether the requirer of the requirement has the access right corresponding to the disk, and password for improving security. The information is structured in a form of table. The virtual disk is a virtual name of a disk designated by processing command issued form the processor 101. In this example, total eight disks are contained in the whole loosely-coupled computer system, and a disk is designated using identifiers from VDISK-1 to VDISK-8.

TABLE 1

| Virtual Disk | Actual Disk Control Computer | Corresponding Disk in Controlled Computer | Access Right Information | Password |
|---|---|---|---|---|
| VDISK-1 | Computer-1 | A | Computer-1 | ABC |
| VDISK-2 | Computer-2 | A | Computer-2 | BCD |
| VDISK-3 | Computer-3 | A | Computer-3 | CDE |
| VDISK-4 | Computer-3 | C | Computer-1, computer-2, computer-3 | DEF |
| VDISK-5 | Computer-3 | B | Computer-1, Computer-2, Computer-3 | EFG |
| VDISK-6 | Computer-2 | B | Computer-2 Computer-3 | FGH |
| VDISK-7 | Computer-1 | B | Computer-1 | GHI |
| VDISK-8 | Computer-1 | C | Computer-1 Computer-2 | HIJ |

The actual disk control computer represents a computer from 100-1 to 100-3 to which the disk control mechanism 104 for controlling a target disk from 106-1 to 106-3 of actual issue of processing command.

The corresponding disk in a control computer represents a disk from 106-1 to 106-3 in the actual disk control computer corresponding to the virtual disk. This disk is referred to as actual disk hereinafter. In this embodiment, it is shown that the control computer is contained in a form of identifier (ID) for controlling disks. The access right information tells that an access from which computer is permitted for each virtual disk. In this example, the access right information is identifiers (ID) of the computers for permitting access. The access right information may be stored individually for each processing command such as data reading, data writing, and status reading. The password is used to improve security. For example, password may be checked for all requirements to improve reliability.

If only a single requirement corresponding to a specific process out of a plurality of requirements from a computer having the access right should be permitted access, a password is added to each of the requirements and checked to improve security.

An example of structural definition information corresponding to the computer-1 in the loosely-coupled computer system structure embodiment 2 is shown. As the structural definition information, the information which shows the correspondence of each computer to the actual disk control computer allows the computer to identify the virtual disk which accepts an access without interpolation of the computer coupling mechanism.

Figure 3:
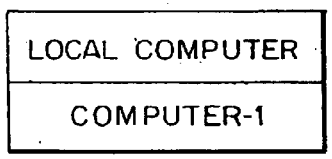
FIG. 3 is a conceptual diagram of an example of structural definition information.

Information shown in Table 1 and FIG. 3 is stored in the external secondary memory device and it may be set when initialization is processed. Otherwise, it is set during operation by a utility tool.

Figure 4:
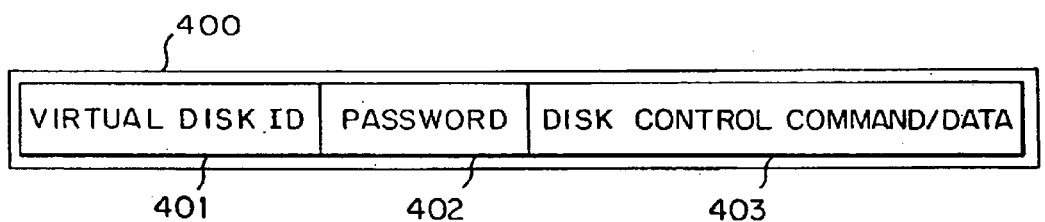
FIG. 4 is a conceptual diagram of an example of disk processing requirement command.

In FIG. 4, an example of a disk processing requirement command issued from the processor 101 is shown. 400 is a disk requirement command. The virtual disk ID 401 is an identifier for designating a disk in the system. The password 402 is necessary for password checking as shown in FIG. 3. The disk control command/data 403 is a command for controlling disks from 106-1 to 106-N, and data necessary for executing the command, and it is issued through the disk control mechanism 104.

Figure 5:
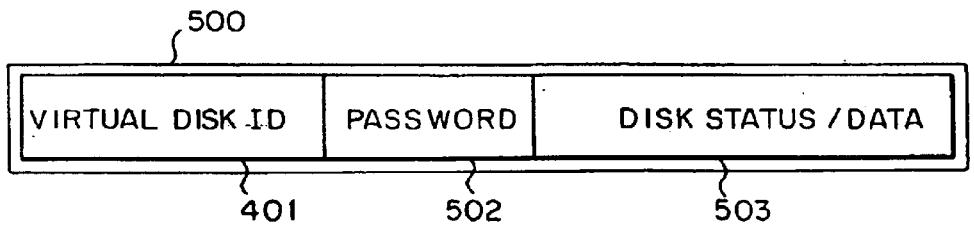
FIG. 5 is a conceptual diagram of an example of disk processing status.

In FIG. 5, an example of a disk processing status which is returned to the processor 101 when disk processing is completed. 500 is the disk processing status. The virtual disk ID 401 is the same as the virtual disk ID 401 in FIG. 4. The password 502 is the same as the password 502 in FIG. 4, but, may not be used when returning. The disk status/data is a status information and data at the end of the command which is returned from the disk from 106-1 to 106-N to the processor 101.

Figure 6:
FIG. 6 is a conceptual diagram of an example of computer coupling mechanism adapter packet.

In FIG. 6, an example of a computer coupling mechanism adapter packet. The computer coupling mechanism performs distribution of packets. The transmission side computer ID 601 is an identifier representing a computer of transmission side. The receiving side computer ID 602 is an identifier representing a computer of receiving side. The data 603 are data which is transferred. It is preferable to add redundant codes for improvement of reliability on the head or tail of a packet to improve reliability. It is also preferable to symbolize a packet to improve security.

Figure 7:
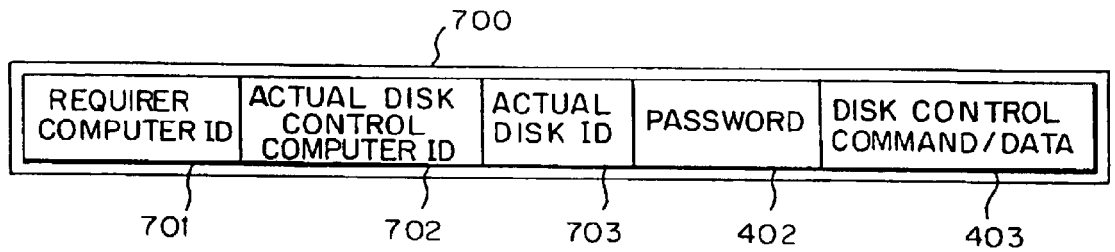
FIG. 7 is a conceptual diagram of an example of remote disk processing requirement command.

In FIG. 7, an example of a remote disk processing requirement command is shown. 700 is a remote disk processing requirement command. The requirer computer ID 701 is an identifier which represents a computer requiring processing to the disk. The actual disk control computer ID 702 is an identifier representing a computer which stores the disk control mechanism 104 controlling directly the computer required for processing of the disk. The actual disk ID 703 is an identifier representing the disk to be processed. The password 402 and disk control command/data 403 are the same command as described in FIG. 4.

Figure 8:
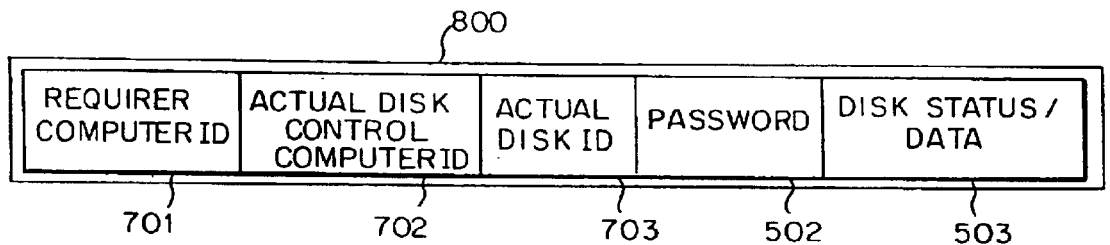
FIG. 8 is a conceptual diagram of an example of remote disk processing status.

In FIG. 8, an example of a remote disk processing status is shown. 800 is a remote disk processing status. The requirer computer ID 701 is an identifier representing the computer which requires processing of the disk, and it is the same command as described in FIG. 7. The actual disk control computer ID 702 is an identifier representing the computer which has the disk control mechanism 104 for controlling directly the disk to be processed, and it is the-same command as described in FIG. 7. The actual disk ID 703 is an identifier representing the disk to be processed, it is the same command as described in FIG. 7. The password 502 and disk status/data 503 are the same commands as described in FIG. 5.

Figure 9:
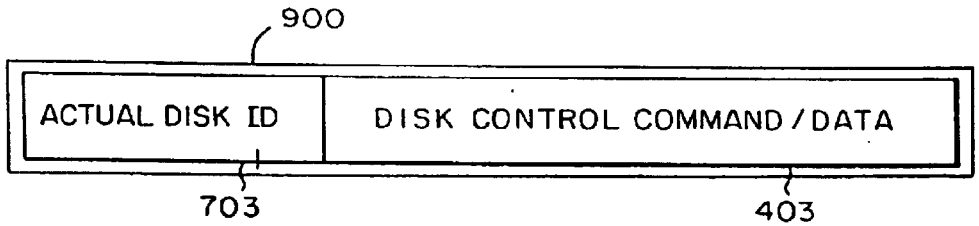
FIG. 9 is a conceptual diagram of an example of actual disk processing requirement command.

In FIG. 9, an example of actual disk processing requirement command is shown. 900 is an actual disk processing requirement command. The actual disk ID 703 is an identifier representing the disk to be processed, it is the same command as described in FIG. 7. The disk control command/data 403 is a command for controlling the disk from 106-1 to 106-N and data necessary for execution of the command. The actual disk processing requirement command is the same command as described in FIG. 4.

Figure 10:
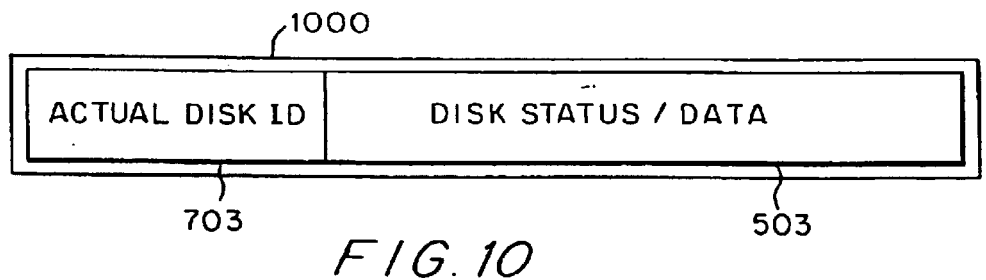
FIG. 10 is a conceptual diagram of an example of actual disk processing status.

In FIG. 10, an example of an actual disk processing status is shown. 1000 is an actual disk processing status. The actual disk ID 703 is an identifier representing the disk to be processed, and it is the same command as described in FIG. 7. The disk status/data 503 is status information at the end of a command which is returned to the processor 101 from the disk from 106-1 to 106-N and data. It is the same command as described in FIG. 5.

Figure 11:
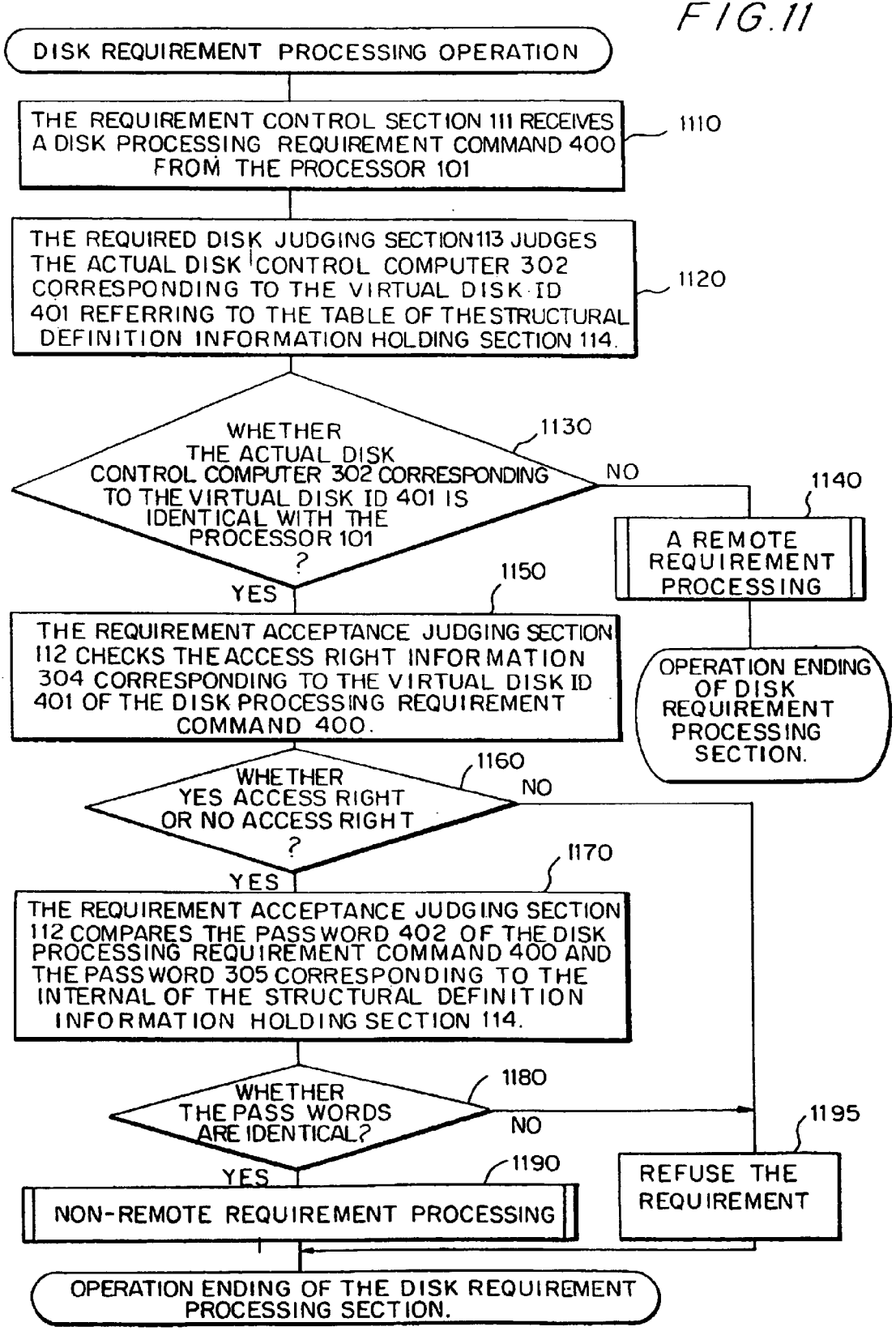
FIG. 11 is an operation flow chart of the disk requirement processing section.

A flow of operation of the disk requirement processing section is described referring to FIG. 11. First, as shown in the step 1110, a disk processing requirement command issued from the processor 101 is received by the requirement control section 111 and the flow proceeds to the step 1120.

As shown in the step 1120, the required disk judging section 113 judges an actual disk control computer (refer to Table 1) corresponding to the virtual disk ID 401 referring to the structural definition information (refer to Table 1) stored in the structural definition information holding section 114, and the flow proceeds to step 1130.

Step 1130 judges whether the actual disk control computer corresponding to the virtual disk ID 401 is identical to the processor 101 which issued the disk processing requirement command referring to the structural definition information (refer to Table 1 and FIG. 3). If the actual disk control computer corresponding to the virtual disk ID 401 is not identical to the processor 101 which issued the disk processing requirement command, the flow proceeds to the branched step 1140, on the other hand, if the actual disk control computer corresponding to the virtual disk ID 401 is identical to the processor 101 which issued the disk processing requirement command, the flow proceeds to the branched step 1150.

If the actual disk control computer corresponding to the virtual disk ID 401 is not identical to the processor 101 which issued the disk processing requirement command, a remote requirement processing operation is executed as shown in the step 1140.

Figures 14A, 14B:
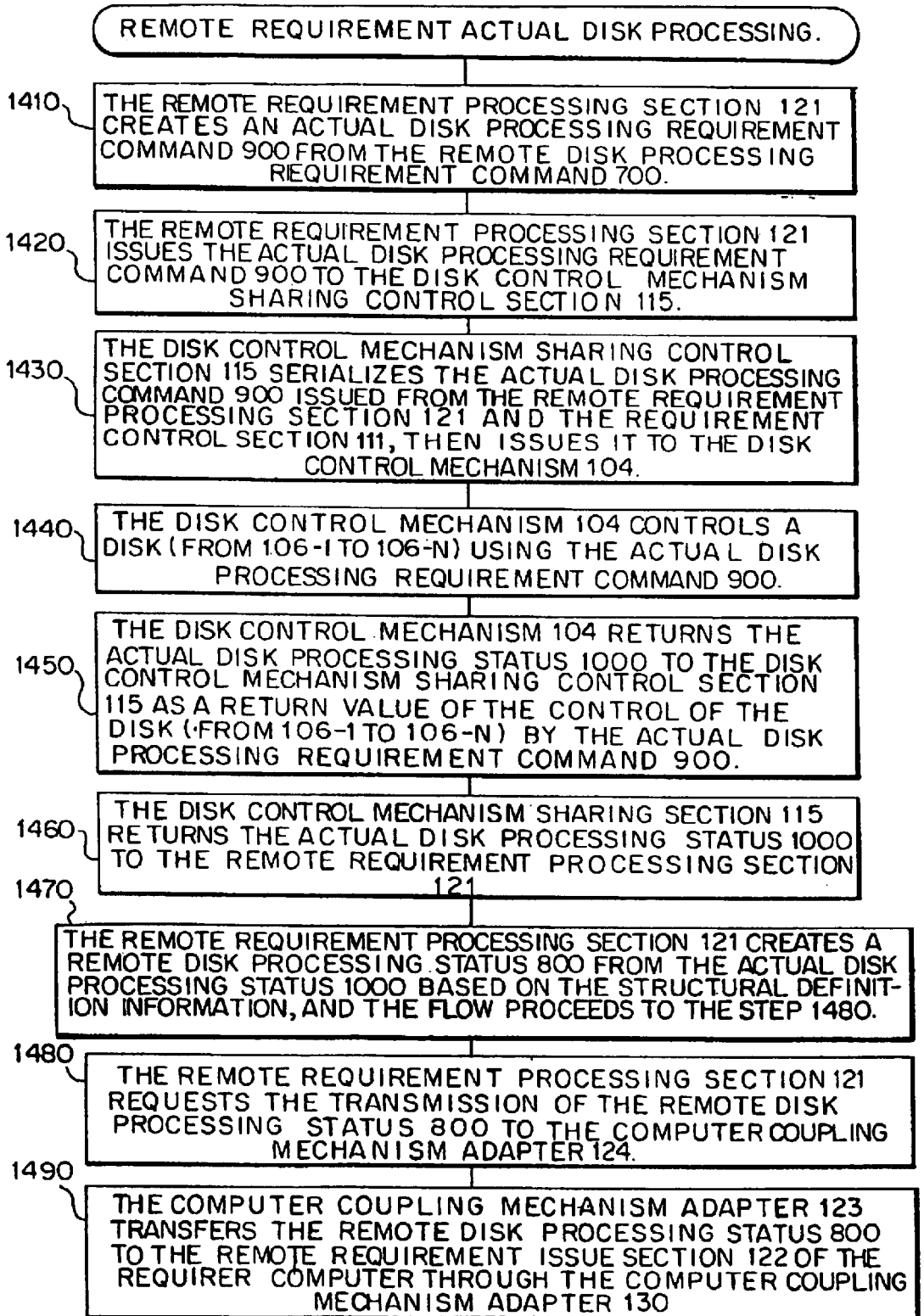
FIG. 14a is a flow chart of the remote requirement actual disk processing.
FIG. 14b is a flow chart of the remote requirement actual disk processing.

The remote requirement processing operation is described referring to FIG. 13 and FIG. 14. If the actual disk control computer corresponding to the virtual disk ID 401 is identical to the processor 101 which issued the disk processing requirement command, as shown in the step 1150, the requirement acceptance judging section 112 checks the access right to the virtual disk ID 401 to be processed designated by the disk processing requirement command 400 referring to access right information (refer to Table 1) of the structural definition information, and the flow proceeds to the step 1160. The access right information represents a computer having access right.

Then, in the case of no access right in the step 1160, the flow proceeds to the branched step 1195, and in the case of yes access right, the flow proceeds to the branched step 1170.

In the case of no access right, the requirement is refused as shown in the step 1195, and the flow ends. In the case of ending with a refusal of the requirement, the requirement control section 111 creates a disk requirement processing status 500 and returns it to the processor 101. The disk processing status 500 sets a status code to inform the results that the virtual disk ID 401 and password 402 are identical to the disk requirement processing command 400 and that the disk status has no access right.

In the case of access right, as shown in the step 1170, the requirement acceptance judging section 112 performs password checking by comparing the password 402 of the disk processing command 400 and the password 305 of the structural definition information stored in the structural definition information holding section 114, the flow proceeds to the step 1180. Then, in the step 1180, if the passwords are not identical, the flow proceeds to the branched step 1195, and if the pass words are identical, the flow proceeds to the branched step 1190. In this example, the status notice is the same for refusals due to no access right and due to mismatch of passwords, but it is preferable to differentiate the status notice to improve fault detection function.

If the passwords are identical, as shown in the step 1190, the non-remote requirement processing is executed and the flow ends. The disk requirement processing operation may be carried out by software when the processor is provided in the disk requirement processing section 110. Non-remote requirement processing operation is described referring to FIG. 12.

Figure 12:
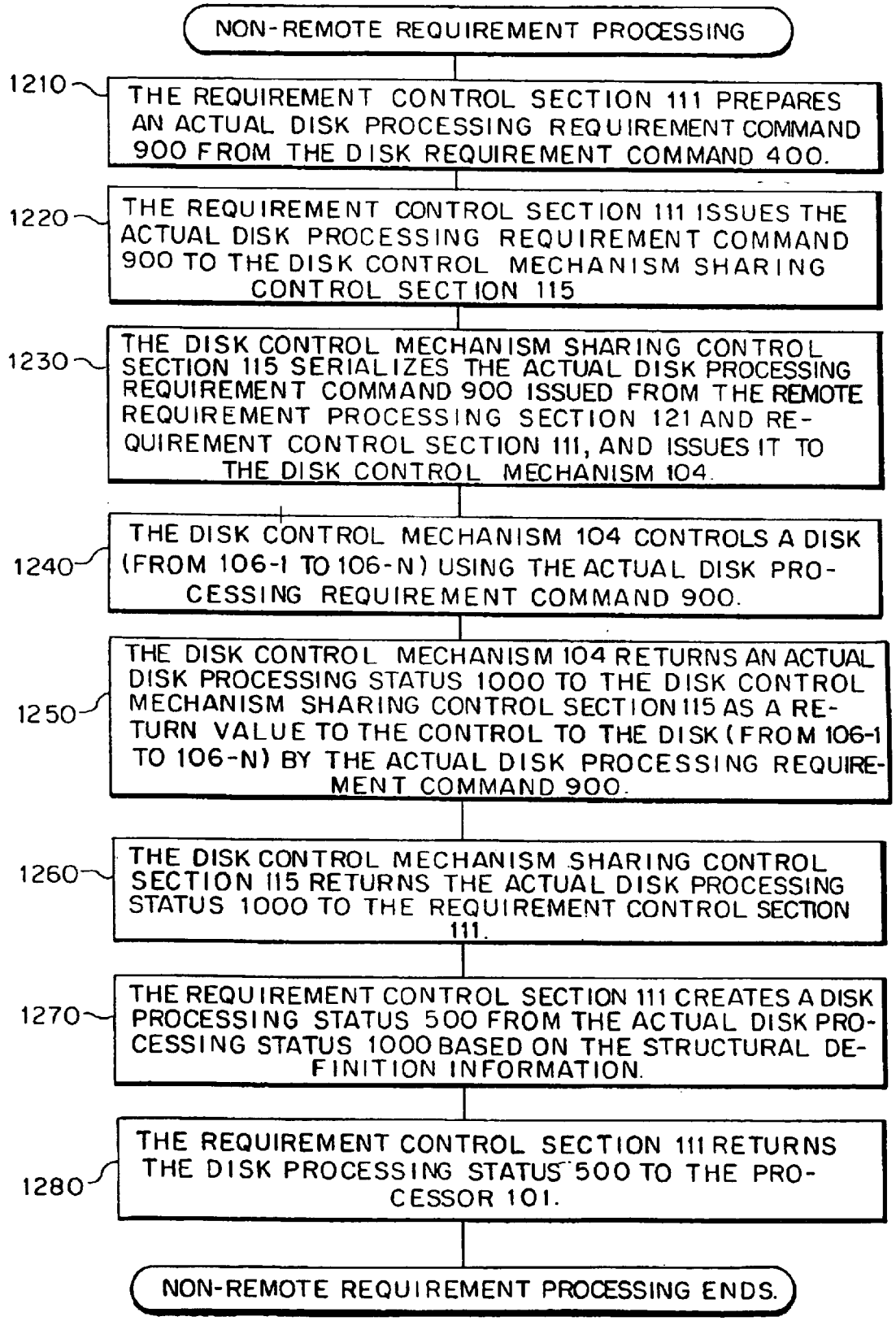
FIG. 12 is a flow chart of the non-remote requirement processing.

A flow of the non-requirement processing operation is described referring to FIG. 12. First, as shown in the step 1210, the requirement control section 111 prepares an actual disk processing requirement command 900 from the disk requirement command 400. The virtual disk ID 401 of the disk processing requirement command 400 is converted to a corresponding actual disk ID 703 referring to the structural definition information (refer to Table 1), thereby, the actual disk processing requirement command 900 is prepared from the disk processing requirement command 400.

Then, as shown in the step 1220, the requirement control section 111 issues the actual disk processing requirement command 900 to the disk control mechanism sharing control section 115.

As shown in the step 1230, the disk control mechanism sharing control section 115 serializes the actual disk processing requirement command 900 issued from the remote requirement processing section 121 and requirement control section 111, and issues it to the disk control mechanism 104. The serializing processing of the actual disk processing requirement command 900 is described in the description of FIG. 15.

As shown in the step 1240, the disk control mechanism 104 controls a disk from 106-1 to 106-N using the actual disk processing requirement command 900. Then, as shown in the step 1250, the disk control mechanism 104 returns an actual disk processing status 1000 to the disk control mechanism sharing control section 115 as a return value to the control to the disk from 106-1 to 106-N by the actual disk processing requirement command 900.

As shown in the step 1260, the disk control mechanism sharing control section 115 returns the actual disk processing status 1000 to the requirement control section 111. Then, as shown in step 1270, the requirement control section 111 retrieves the virtual disk ID 401 corresponding to the actual disk ID 703 of the actual disk processing status 1000 referring to the structural definition information (refer to FIG. 3A), thereby the requirement control section 111 creates a disk processing status 500.

As shown in step 1280, the requirement control section 111 returns the disk processing status 500 to the processor 101, and the non-remote requirement processing ends. The non-remote requirement processing operation may be performed by software alternatively when the processor is incorporated in the disk requirement processing section 110.

A flow of the remote requirement processing operation is described referring to FIG. 13. First, as shown in the step 1310, the remote requirement issue section 122 creates a remote disk processing requirement command 700 from the disk processing requirement command 400 and structural definition information. Referring to the structural definition information (refer to Table 1), the virtual disk ID 401 of the disk processing requirement command 400 is converted to the corresponding actual disk ID 703, thereby, the actual-disk processing requirement command 900 is created from the disk processing requirement command 400. Then, as shown in the step 1320, the remote requirement issue section 122 requires transmission of the remote disk processing requirement command 700 to the computer coupling adapter control section 123.

As shown in the step 1330, the computer coupling mechanism adapter control section 123 transfers the remote disk processing requirement command 700 to the remote requirement processing section 121 of the actual disk control computer (refer to Table 1) through the computer coupling mechanism adapter 130. Then, as shown in the step 1340, the remote requirement processing section 121 requests checking of access right of the remote disk processing requirement command 700 to the requirement acceptance judging section 112.

As shown in the step 1350, the requirement acceptance judging section 112 receives the remote disk processing requirement command 700, and checks the access right to the actual disk control computer ID 702 and actual disk ID 703 to be processed as designated by the remote disk processing requirement command 700 by retrieving the access right information (refer to Table 1) of the structural definition information, and the flow proceeds to the step 1360. Then, as shown in the step 1360, if there is no access right, the flow proceeds to the branched step 1395, and if there is access right, the flow proceeds to the branched step 1370.

When there is no access right, as shown in the step 1395, the requirement is refused, and the flow ends. When the requirement is refused and the flow ends, the remote requirement processing section 121 creates a remote disk processing status 800, and returns it to the remote requirement issue section 122 and sends an error notice to the processor which issued the disk processing requirement command. Details of this processing are described in the description of FIG. 16.

When there is access right, as shown in the step 1370, the requirement acceptance judging section 112 compares the password of 402 of the remote disk processing requirement command 700 and the password 305 of the structural definition information stored in the structural definition information holding section 114 to check password, and the flow proceeds to the step 1380. Then, in the step 1380, if the passwords are not identical, the flow proceeds to the branched step 1395. On the other hand, if the passwords are identical, the flow proceeds to the branched step 1390. In this example, the status notice is the same for refusals due to no access right and due to mismatch of pass words, but it is preferable to differentiate the status notice to improve fault detection function.

If the passwords are identical, as shown in the step 1390, the remote requirement actual disk processing is executed and the flow ends. The remote requirement processing operation may be performed by software alternatively when the processor is incorporated in the disk requirement processing section 110. The remote requirement actual disk processing is describe in reference to FIG. 14.

A flow of the remote requirement actual disk processing is described referring to FIG. 14. First, as shown in the step 1410, the remote requirement processing section 121 creates an actual disk processing requirement command 900 from the remote disk processing requirement command 700, and the flow proceeds to the step 1420. The actual disk ID 703 of the actual disk processing requirement command is identical with the actual disk ID 703 of the remote disk requirement command 700, and the disk control command/data 403 of the actual disk processing requirement command is identical with the disk control command/data 403 of the remote disk requirement command 700. Then, as shown in the step 1420, the remote requirement processing section 121 issues the actual disk processing requirement command 900 to the disk control mechanism sharing control section 115, and the flow proceeds to the step 1430.

As shown in the step 1430, the disk control mechanism sharing control section 115 serializes the actual disk processing command 900 issued from the remote requirement processing section 121 and the requirement control section 111, then issues it to the disk control mechanism 104, and the flow proceeds to the step 1440. The operation of the-disk control mechanism sharing control section 115 is described in reference to FIG. 15. As shown in the step 1440, the disk control mechanism 104 controls a disk (from 106-1 to 106-N) using the actual disk processing requirement command 900, and the flow proceeds to the step 1450.

As shown in the step 1450, the disk control mechanism 104 returns the actual disk processing status 1000 to the disk control mechanism sharing control section 115 as a return value of the control of the disk from 106-1 to 106-N by the actual disk processing requirement command 900, and the flow proceeds to the step 1460. Then, as shown in the step 1460, the disk control mechanism sharing section 115 returns the actual disk processing status 1000 to the remote requirement processing section 121, and the flow proceeds to the step 1470.

As shown in the step 1470, the remote requirement processing section 121 creates a remote disk processing status 800 from the actual disk processing status 1000 based on the structural definition information, and the flow proceeds to the step 1480. In the step 1480, the remote requirement processing section 121 requests the transmission of the remote disk processing status 800 to the computer coupling mechanism adapter 123, and the flow proceeds to the step 1490.

In the step 1490, the computer coupling mechanism adapter 123 transfers the remote disk processing status 800 to the remote requirement issue section 122 of the requirer computer through the computer coupling mechanism adapter 130, and the flow proceeds to the step 1492. Then, as shown in the step 1492, the remote requirement issue section 122 retrieves the virtual disk ID 401 corresponding to the actual disk control computer ID 702 and actual disk ID 703 of the remote disk processing status 800 referring to the structural definition information (refer to Table 1) and creates a disk processing status 500. The flow then proceeds to the step 1495. In the step 1495, the remote requirement issue section 122 returns the disk processing status 500 to the processor 101, and the flow ends. The remote requirement actual disk processing operation may be performed by software alternatively when the processor is incorporated in the disk requirement processing section 110.

FIG. 15 shows an embodiment of disk control mechanism sharing control section 115. The disk control mechanism sharing control section 115 comprises a remote requirement processing section-corresponding-requirement holding section 1510, requirement control section-corresponding-requirement holding section 1520, disk requirement serializing section 1530, and actual disk control section 1540.

The remote requirement processing section-corresponding-requirement holding section 1510 holds the actual disk requirement command 900 and actual disk processing status 1000 issued from the remote requirement processing section 121. The remote requirement processing section-corresponding-segment holding section 1510, for example, comprises logic such as TTL and CMOS.

The requirement control section-corresponding-requirement holding section 1520 holds the actual disk requirement command 900 and actual disk processing status 1000 issued from the requirement control section 111. The requirement control section-corresponding-requirement holding section 1520, for example, comprises a logic such as TTL and CMOS.

The disk requirement serializing section 1530 serializes the actual disk requirement command 900 issued from the remote requirement processing section 121 and the requirement control section 111, and provides it to the actual disk control section 1540. The disk requirement serializing section 1530, for example, comprises logic such as TTL and CMOS. Examples of the serialization of each requirement include round-robin scheduling in which requirements in the remote requirement processing section-corresponding-requirement holding section 1510 and a requirement in the requirement control section-corresponding-requirement holding section 1520 are fetched alternately.

The disk control section 1540 is a section for issuing the actual disk requirement command 900 and receiving the actual disk processing status 1000. Actual disk requirement commands 900 are issued to the disk control mechanism 104 according to the order issued from the disk requirement serializing section 1530. Actual disk processing statuses 1000 are received according to the order issued from the disk control mechanism 104. The received actual disk processing status 1000 is transferred to the remote requirement processing section-corresponding-requirement holding section 1510 and requirement control section-corresponding-requirement holding section 1520 through the disk requirement serializing section 1530.

The actual disk processing status 1000 is returned from the remote requirement processing section-corresponding-requirement holding position 1510 to the remote requirement processing section 121. The actual disk processing status 1000 is returned from the requirement control section-corresponding-requirement holding section 1520 to the requirement control section 111. The disk control mechanism sharing control section may be replaced by software alternatively when the processor is incorporated in the disk requirement processing section 110.

A flow of the remote requirement refuse processing is illustrated in FIG. 16. First, as shown in the step 1610, the remote requirement processing section 121 creates a remote disk processing status 800 from the status to the access right error and password error and remote disk processing requirement command 700, and the flow proceeds to the step 1620. The remote disk processing requirement command 700 and the remote disk processing status 800 are identical except for the disk control command/data 403 and disk status/data 503.

As shown in step 1620, the remote requirement processing section 121 requests the computer coupling mechanism adapter control section 123 to transmit the remote disk processing status 800, and the flow proceeds to the step 1630. Then, as shown in step 1630, the computer coupling mechanism adapter 123 transfers the remote disk processing status 800 to the remote requirement issue section 122 of the requirer computer, and the flow proceeds to the step 1640.

In step 1640, the remote requirement issue section 122 creates a disk processing status 500 from the remote disk processing status 800 by retrieving the virtual disk ID 401 corresponding to the actual disk control computer ID 702 and actual disk ID 703 of the remote disk processing status 800 and referring to the structural definition information (refer to Table 1. The flow then proceeds to the step 1650.

In step 1650, the remote requirement issue section 122 returns the disk processing status 500 to the processor 101, and the flow ends. The remote requirement refusing operation may be performed by software alternatively when the processor is incorporated in the disk requirement processing section 110.

As described hereinbefore, according to the present invention, processing requirement between the bus to which hard disks to be shared and the attachment for remote access are transferred as required, thereby, an access to the attachment is operated only when it is necessary, and the processor in which a requirement arises controls directly the hard disk. Thus, a loosely-coupled computer system having high performance shared disks can be structured.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. In a computer system having a plurality of computers connected to each other and a plurality of shared disks, each of said plurality of shared disks being coupled to at least one of said plurality of computers, each of said plurality of computers comprising:

a processor for issuing a disk request to access to one of said shared disks; and a disk request processing section, separate from said processor, which receives said disk request from the processor, determines whether said disk request requests access to a shared disk connected to said computer or requests access to a shared disk connected to another computer and sends said disk request to the shared disk connected to said computer if said disk request requests access to the shared disk connected to said computer, and sends said disk request to said another computer to access a shared disk connected to said another computer if said disk request requests access to the shared disk connected to said another computer.

2. A computer according to claim 1, wherein said disk request processing section further comprises:
a memory for storing structural definition information which describes a structure of said computer system including connections between said computers and said shared disks; and
a disk request judging section for judging which shared disk is requested by said disk request according to said structural definition information.

3. A computer according to claim 2, wherein said disk request processing section further comprises:
a disk request acceptance judging section for checking whether the sender of said disk request has access right to a shared disk to which access is requested according to said structural definition information,
wherein said structural definition information includes a password to allow access to said shared disk to which access is requested.

4. A computer according to claim 2, wherein said structural definition information includes information indicating a correspondence between said shared disks and a plurality of identifiers.

5. A computer according to claim 1, wherein said disk request processing section comprises:
a remote processing disk request section for issuing a remote disk request to said another computer to access the shared disk connected to said another computer.

6. A computer system comprising:
a plurality of computers as defined in claim 1; and
a computer coupling mechanism which connects said plurality of computers to each other,
wherein said each of said plurality of computers sends said disk request to said computer coupling mechanism if a shared disk to which access is requested is connected to another computer connected to said computer coupling mechanism.

7. A computer system according to claim 6, wherein said disk request processing section further comprises:
a memory for storing structural definition information which describes a structure of said computer system; and
a disk request judging section for judging which shared disk to which access is requested by said disk request according to said structural definition information.

8. A computer system according to claim 7, wherein said disk request processing section further comprises:
a disk request acceptance judging section for checking whether the sender of said disk request has access right to a shared disk to which access is requested according to said structural definition information,
wherein said structural definition information includes a password to allow access to said shared disk to which access is requested.

9. A computer according to claim 1, further comprising:
a controller which controls said shared disk connected to said computer,
wherein said disk request processing section receives a disk request from said another computer, and said controller accesses said shared disk connected to said computer when said disk request from said another computer requests access to the shared disk connected to said computer.

10. In a computer system having a plurality of computers coupled to each other and a plurality of shared disks each being coupled to one of said plurality of computers, said each of said plurality of computers comprises:
a processor which outputs a disk request for requesting access to said plurality of shared disk; and
a disk request processing section, separate from said processor, which controls access to said shared disks based on said disk request from said processor,
wherein said disk request processing section comprises:
a memory for storing structural definition information which describes a structure of said computer system including connections between said computers and said shared disks, and
a disk request judging section for judging whether said disk request received from said processor requests access to a shared disk connected to said computer or requests access to a shared disk connected to another computer based on said structural definition information.

11. A disk request processing section according to claim 10, wherein said disk request processing section further comprises:
a disk request acceptance judging section for checking whether a sender of said disk request has access right to a shared disk to which access is requested according to said structural definition information,
wherein said structural definition information includes a password to allow access to said shared disk to which access is requested.

12. A disk request processing section according to claim 10, wherein said structural definition information includes information indicating a correspondence between said shared disks and a plurality of identifiers.

13. A disk request processing section in claim 10, wherein said disk request processing section comprises:
a remote processing disk request section for issuing a remote request to another computer to access the shared disk connected to said another computer if access is requested to the shared disk connected to said another computer.

14. A computer according to claim wherein said disk request processing section receives a disk request from the disk request processing section of said another computer.

15. In a computer system having a plurality of computers coupled to each other and a plurality of shared disks each being coupled to one of said plurality of computers, each of said plurality of computers executes a computer program for controlling access to said plurality of shared disks to be accessed, said computer program comprising:
a first code for receiving a disk request from a processor in said computer requesting access to said shared disks,
a second code for causing said computer to determine whether said disk request received from said processor requests access to a shared disk connected to said computer or requests access to a shared disk connected to another computer; and
a third code for causing said computer to send said disk request received from said processor to said shared disk connected to said computer if said disk request received from said processor requests access to said shared disk connected to said computer, and to send said disk request received from said processor to said another computer if said disk request received from said processor requests access to said shared disk connected to said another computer.

16. A computer program according to claim 15, further comprising:
   a fourth code for causing said computer to store structural definition information in a memory, said structural definition information describes a structure of said computer system including connections between said computers and said shared disks;
   a fifth code for causing said computer to check whether said disk request requests access to the shared disk connected to said another computer according to structural definition information; and
   a sixth code for causing said computer to send said disk request to said another computer if said disk request requests access to the shared disk connected to said another computer.

17. A computer program according to claim 16, wherein said structural definition information includes information indicating a correspondence between said shared disks and a plurality of identifiers.

18. A computer program according to claim 15, wherein said second code comprises:
   a code for causing said computer to issue a remote disk request to said another computer to access the shared disk connected to said another computer if access is requested to the shared disk connected to said another computer.

19. A computer program according to claim 15, further comprising:
   a fourth code for receiving a disk request from said another computer,
   a fifth code for causing said computer to access said shared disk connected to said computer when said disk request from said another computer requests access to said shared disk connected to said computer.

20. In a computer system having a plurality of computers coupled to each other and a plurality of shared disks each being coupled to one of said plurality of computers, each of said plurality of computers comprises:
   a processor which outputs a disk request for requesting an access to said plurality of shared disks; and
   a disk request processing section, separate from said processor, which controls access to said plurality of shared disks based on said disk request from said processor,
   wherein said disk request processing section comprises:
   a memory for storing structural definition information which describes a structure of said computer system including connections between said computers and said shared disks,
   a request controller for receiving said disk request, from said processor, for accessing a disk which is one of said shared disks, and
   a disk request judging section for judging whether said disk request received from said processor requests access to a shared disk connected to said computer or requests access to a shared disk connected to another computer based on said structural definition information.

* * * * *